United States Patent [19]

Michelotti

[11] 4,212,621
[45] Jul. 15, 1980

[54] BLADDER MOLDING

[76] Inventor: Paul E. Michelotti, 59 Bob Hill Rd., Ridgefield, Conn. 06877

[21] Appl. No.: 50,827

[22] Filed: Jun. 21, 1979

[51] Int. Cl.$^2$ .............................................. B29G 7/00
[52] U.S. Cl. ............................... 425/405 H; 425/543; 425/DIG. 19; 425/DIG. 44; 249/65
[58] Field of Search .................... 425/78, 405 H, 543, 425/DIG. 44, DIG. 19; 249/65

[56] References Cited

U.S. PATENT DOCUMENTS

| | | | |
|---|---|---|---|
| 2,847,708 | 8/1958 | Hamjean et al. | 425/405 H X |
| 3,112,166 | 11/1963 | Montogomery et al. | 425/405 H X |
| 3,178,807 | 4/1965 | Bergmann | 425/405 H X |
| 3,220,103 | 11/1965 | Simons | 425/405 H X |
| 3,561,079 | 2/1971 | Anderson | 425/405 H X |
| 3,577,635 | 5/1971 | Bergmann et al. | 425/405 H X |
| 3,618,179 | 11/1971 | Anderson et al. | 425/405 H |
| 3,741,755 | 6/1973 | Allen | 425/405 H X |
| 3,815,863 | 6/1974 | Andeweg | 425/DIG. 44 |
| 3,964,846 | 6/1976 | Blins | 425/DIG. 19 X |

Primary Examiner—J. Howard Flint, Jr.
Attorney, Agent, or Firm—Charles F. Gunderson

[57] ABSTRACT

A molding system for large-scale containers using closely-spaced bladders, one inside the other, to contain a resinous material that will harden to form a rigid container. The bladders float in a liquid of the same specific gravity as that of the resinous material, and the inner bladder is filled with a liquid of the same specific gravity. The inner bladder may be filled first to establish the size or volume of the container, and then the resinous material may be filled between the inner and outer bladder layers whereat it will harden to form the container.

5 Claims, 3 Drawing Figures

BLADDER MOLDING

BACKGROUND OF THE INVENTION

There are very many forms of molds, and as many molding techniques, and even as many materials that can be used to mold objects. Almost all molds are hollow and of suitable characteristics to receive a given molding material, which may be anything from a molten metal to a liquid plaster or one of the new plastics. Many such molds, particularly for metals and plasters, have been in use for thousands of years.

Most of the ancient molds have been solid, and most of the materials poured into the molds have been in a liquid form, initially, that later hardened into a solid. Some molds were formed in two or more elements to be separated to release the molded object, but other molds had to be broken away to release the molded object.

Newer molding techniques involve latex rubber or plastics formed over solid forms to be duplicated. Rubber and plastic materials may also be used as the molding material.

Almost all conventional molding is most applicable to relatively small objects; either to copy, or to form for simple shapes which may be solid. Larger units are almost always made hollow, to save material and weight, or to function as containers. These are often poured or pressed between an inner and an outer mold section. Such techniques have been adapted to fairly large statues, containers, and the like.

However, there is almost no known technique for forming very-much larger objects, and particularly very-large containers and the like. The larger the vessel or container, the more difficult and expensive it is to make the mold and to use it. Consequently, most large containers are made by other, slower, more laborious, and more expensive techniques. For example, a solid frame may be made in the shape desired and the molding material laid up, with or without reenforcing, within the frame.

It is therefore an object of this invention to provide a mold for the molding of large, nominally-spherical containers, of almost any size.

It is a further object of this invention to provide a mold that utilizes partially-resilient bladders to define an enclosure and form a container between an inner and an outer layer.

SUMMARY OF THE INVENTION

A typical enclosure, according to this invention, is formed between a pair of bladders; a smaller, inner bladder and a slightly-larger outer bladder. Both bladders are positioned within a pool of liquid large enough to accommodate the desired container. The inner bladder is filled with the same liquid to establish the volume of the container, and the slightly-larger outer bladder is spaced to establish the thickness of the wall of the container. A molding material, of thermosetting plastic, for example, of the same density as the liquid, is poured between the two bladders to completely fill the void and to ultimately harden to form the container. When the material hardens, the container can be evacuated, and used for any desired purpose.

DETAILED DESCRIPTION OF THE PREFERRED EMBODIMENT

Figure 1:
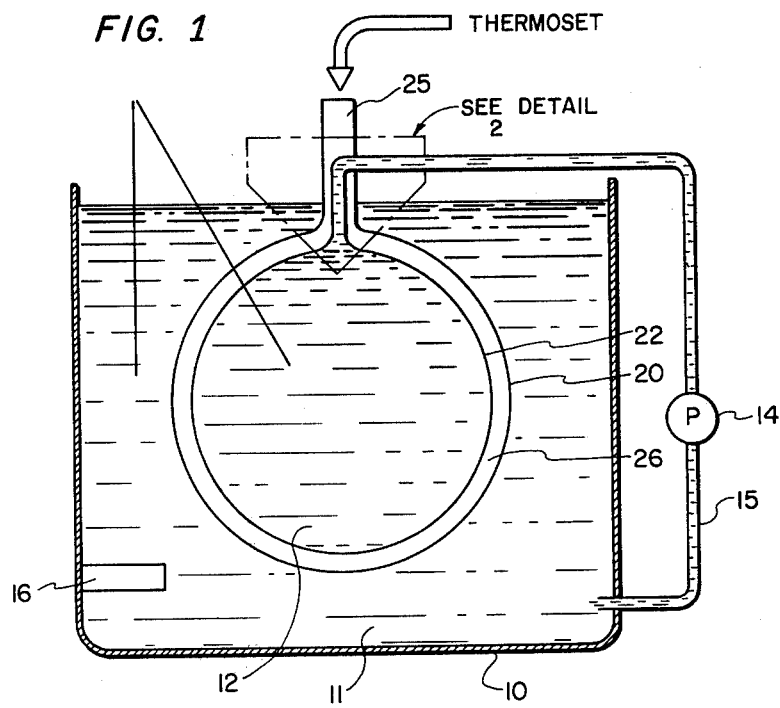
FIG. 1 shows a cross section of the overall device.

Referring now more particularly to FIG. 1, the device is shown in cross section within a tank 10 filled with a fluid 11. An outer bladder 20 surrounds an inner bladder 22. The inner bladder may be filled with a fluid 12 through a transfer pipe 15 and a pump 14. A heater 16 may be provided to establish the temperature of the fluid.

Figure 2:
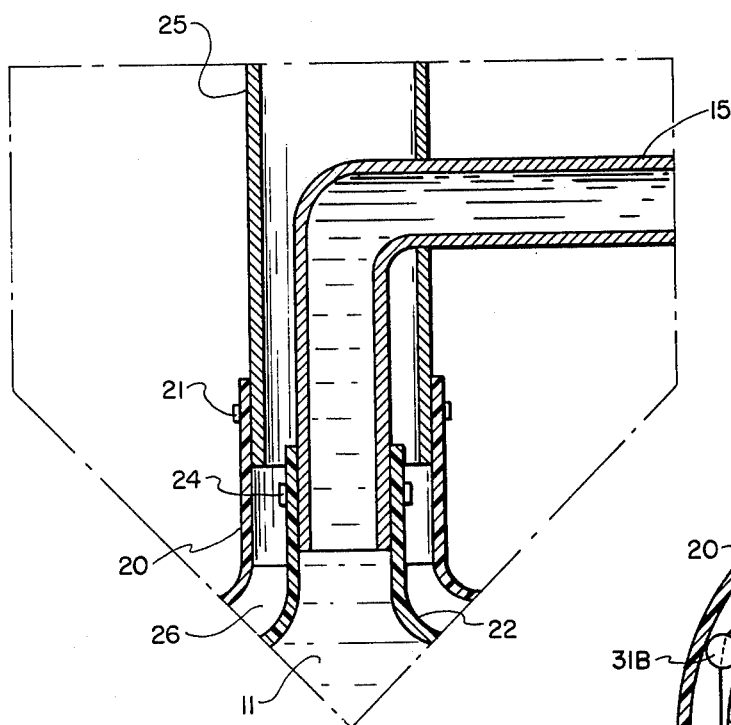
FIG. 2 shows an enlarged cross-section of the neck portion of the device.

The top or nozzle of the outer bladder 20 may be secured to an input pipe 25 by means of a retaining band 21, seen more clearly in the enlarged cross section of FIG. 2. The top or nozzle of the inner bladder 22 may be secured to another input pipe 15 by means of another retaining band 24.

Figure 3:
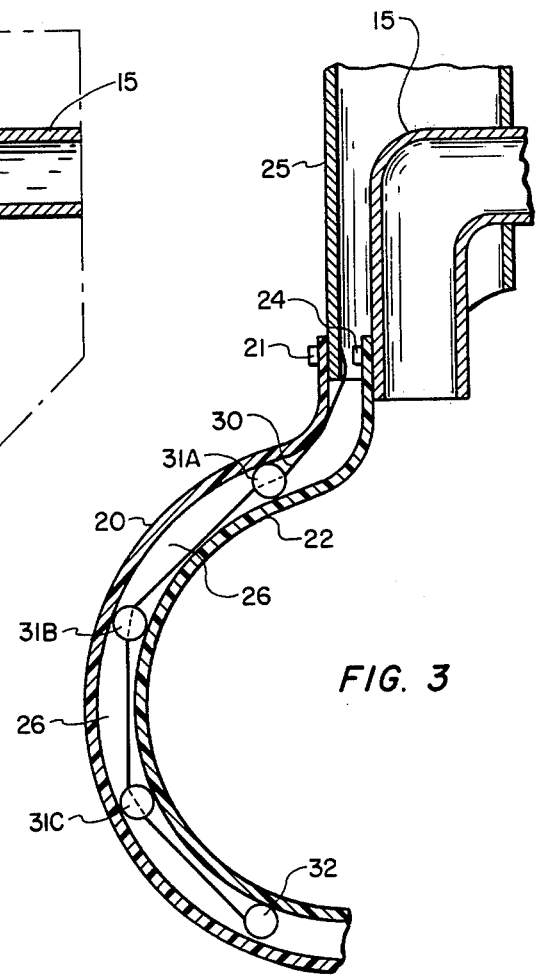
FIG. 3 shows a cross section of a variation of a portion of the device.

FIG. 3 shows a cross section of a variation of the device, not in the containing fluid, for simplicity, with an outer bladder 20, and an iner bladder 22, secured as before to the pipes 25 and 15. This variation shows a series of spacers, 31A, 31B, and 31C, connected together by a wire 30 attached to the neck portion of the mold, and drawn down between the two bladders by a sinker-spacer 32.

In operation, the inner and outer bladders literally float between the fluids 11 and 12 in the big tank 10. Since the liquids 11 and 12, and the ultimate, resinous, thermoset material 26 are of the same density, there can be no tendency for the bladders to distort in any way or for the thermoset material to settle in top or bottom portions to cause uneven thicknesses of the wall of the container.

The bladders 20 and 22 may be of any impervious material, such as a plastic or rubber, to contain the thermosetting resinous material and to keep the fluids 11 or 12 out of the resin, since moisture can have a deleterious effect on certain resins. One or both of these bladders may be reenforced with cloth or fiberglass or wire, in a well known manner, to reduce the possibility of splitting, uneven stretching, or to define a more precise volume. For the inner bladder, this would define the volume of the ultimate container, and for the outer bladder this would define the outer parameters or the thickness of the container.

Typical couplings between the necks of the bladders are the filler tubes 15 and 25 respectively may be bands such as 21 and 24, shown in detail in FIG. 2. These would be an obvious means for securing the necks and the tubes, but other clamps or means well known in the art would also be applicable.

Actually the ends of the tubes 15 and 25 could include removeable portions, not shown, that could be molded into the resinous material to beome a permanent part of the container, and, obviously, a permanent coupling for filling and emptying the container. Such permanent coupling could have threading or other facilities for connecting and disconnecting to the tubes 15 and 25 as well as to any other future coupling.

The additional wire and ball networks shown in FIG. 3 would serve the dual function of maintaining a precise spacing between the inner and outer bladders as well as providing reenforcement within the resinous material. Obviously, there can be any number of networks of spacers similar to that shown, but spaced around the container. They can also be spaced in depth as they approach the maximum circumference of the container. The spacers may be of preformed and hardened ball or pellet samples of the resinous material that is to be used to form the container or of a similar material, but they should have comparable strength and other physical characteristics to not weaken the shell of the container. They could be of slightly heavier density to settle down within the space between the bladders, or they may be drawn down by a heavier sinker 32. Other materials can also be used for spacing and reenforcement. For example a flexible mesh of the desired thickness can be inserted between the bladders.

The spacing with artificial spacers need not be uniform but may be varied to provide thicker walls at the lower portion of the container, for example, to strengthen that portion of the container if and when it is removed from its forming pool.

Heaters such as 16 are shown to indicate that the temperature of the entire system can be controlled to be optimum for the thermosetting and the curing of the desired resin. In fact it may be desirable to fill in the resin at a non-setting temperature before hand to allow time for setting. The temperature may then be raised by means of the heaters, such as 16 to the correct temperature for the thermosetting function.

While the volume of the container may be best controlled by the volume of fluid within the inner container, the thickness of the walls of the container may also be established by the amount of the thermoset resin that fills the space between the two bladders. Since the entire system is floating, and the outer bladder may be stretchable, it will automatically fill out to the exact amount necessary for the desired wall thickness.

While the fluids and the resins are of carefully chosen densities, to not "float" with respect to each other, any air trapped within the fluids or the resins will float to the top, and can be vented in the course of the molding.

A typical thermosetting resin that would be useable here would be the liquid polymer "Vibrathane 6004" manufactured by Uniroyal Chemical of Naugatuck, Connecticut. The fluid 11 and 12 may be a mineralized water adjusted to the identical density as that of the liquid polymer.

It is to be understood that I do not desire to be limited to the exact details of construction shown and described since obvious modifications will occur to a person skilled in the art.

What is claimed is:

1. A device for molding large scale containers of thermosetting plastics comprising a molding tank filled with a fluid of a given specific gravity; a first outer bladder positioned within said molding tank; a second inner bladder within said outer bladder and spaced from said outer bladder; means for filling said inner bladder with a fluid of said given specific gravity; means for filling the space between said outer and said inner bladder with a thermosetting plastic of said given density.

2. A device for molding thermosetting plastics as in claim 1 having a heater positioned within said molding tank to maintain the temperature of said fluid within said molding tank and said inner bladder at a desired level for the curing of said thermosetting plastic.

3. A device for molding thermosetting plastics as in claim 1 including means for maintaining a given spacing between said outer bladder and said inner bladder.

4. A device for molding thermosetting plastics as in claim 1 having means positioned between said outer bladder and said inner bladder for reenforcing said thermosetting plastic.

5. A device for molding thermosetting plastics, as in claim 3 wherein said means for maintaining a given spacing between said outer bladder and said inner bladder comprises a plurality of pellets of said given specific gravity and a given diameter uniformly spaced within said thermosetting plastic between said outer bladder and said inner bladder.

* * * * *